United States Patent Office 3,205,189
Patented Sept. 7, 1965

3,205,189
POLYVINYL CHLORIDE COMPOSITIONS STABILIZED WITH A TRISHYDROXY PHENYLPROPANE
Hugh Wilma Boulton Reed, Norton-on-Tees, England, assignor to Imperial Chemical Industries Limited, London, England, a corporation of Great Britain
No Drawing. Filed July 3, 1961, Ser. No. 121,360
Claims priority, application Great Britain, July 8, 1960, 23,901/60
4 Claims. (Cl. 260—31.8)

This invention relates to stabilized polyvinyl chloride compositions.

According to the present invention a polyvinyl chloride composition comprises polyvinyl chloride, a plasticizer therefor and a trishydroxyaryl alkane. The alkane chain may have other substituents such as aryl radicals attached thereto.

Preferably, the hydroxyaryl groups are attached directly by their ortho or para positions to the chain

in the alkane group of the trishydroxyaryl alkane, two of the said hydroxyaryl groups being attached to the said chain by the terminal carbon atom which is shown with a hydrogen atom attached thereto. Particularly suitable trishydroxyaryl alkane compounds for use in the compositions of the present invention comprise non-resinous condensation products obtained by the condensation of one mole of an aldehyde having an alpha-beta double bond and an unsubstituted alpha carbon atom, with three moles of a hydroxyaryl compound having a free ortho or para position, conveniently in a suitable solvent and in the presence of a condensation agent. The hydroxyaryl radicals of these trishydroxyaryl compounds are preferably like monohydroxyphenyl radicals, particularly those in which the 3 and 6 positions relative to the hydroxy group are occupied by alkyl radicals. Preferred alkyl substituted hydroxy phenyl radicals include those derived from 3-methyl-6-tertiary butyl phenol, and 2-methyl-6-tertiary butyl phenol, each phenyl radical being attached by the para position to the hydroxy group. The alkane chain of these compounds preferably contains not more than 6 carbon atoms but may be substituted, e.g. by an aryl group. Thus, preferred alkane radicals are those derived by condensation of acrolein, crotonaldehyde and cinnamaldehyde.

The amount of trishydroxyaryl alkane present in these compositions is a minor amount, preferably less than 1% and may be incorporated by any convenient method. For example, it may first be dissolved or dispersed within the liquid plasticizer which is to be used in conjunction with the polyvinyl chloride. A further feature of the present invention therefore comprises a plasticizer composition suitable for use in polyvinyl chloride and containing a minor amount of a trishydroxyaryl alkane as hereinbefore defined.

Alternatively, the trishydroxyaryl alkane may be compounded simultaneously with the other components of the composition, for example by kneading or maceration.

The amount and kind of plasticizer which may be incorporated into the compositions of the present invention are conventional, for example 20–120 parts by weight of plasticizer, per 100 parts by weight of polyvinyl chloride, suitable plasticizers being, for example phthalic esters of alcohols such as 3,5,5-trimethylhexanol, or the mixture of branched chain alcohols containing 7–9 carbon atoms which is sold under the registered trademark "Alphanol," or isodecanol, i.e. the carbonylation alcohol from propylene trimer.

Compositions according to the present invention may include other additives including other antioxidants, pigments etc.

The advantage of the compositions according to the invention is that they are particularly resistant to undesirable color formation during compounding. Moreover, these compositions retain, for prolonged periods, a desirably low cold flex temperature property and show diminished loss of plasticizer at elevated temperatures.

Example 1

A composition according to the present invention was compounded by milling the following ingredients at 150° C. for 20 minutes.

| Components: | Parts by weight |
|---|---|
| "Corvic" (registered trademark), D65/8 | 100 |
| Di-iso-octyl phthalate | 50 |
| Cadmium stearate | 1 |
| Stearic acid | 0.5 |
| Antioxidant | 0.1 |

The antioxidant was obtained by condensing three moles of 3-methyl-6-tertiary butyl phenol with one mole of crotonaldehyde in glacial acetic acid and in the presence of hydrogen chloride. It may be regarded as methyl tris(para-3-methyl-6-tert.butylphenol) propane. "Corvic" is a polyvinyl chloride.

The milled composition was pressed at 150° C. into sheets 0.05 inch thick, samples of which were kept under observation in an oven maintained at 150° C. and the time recorded in which discoloration of the initially transparent, colorless sheets first appeared. This time was approximately 5 hours.

A control test was carried out in which the experimental conditions in the above example were exactly reproduced with the exception that the antioxidant component was excluded from the formulation. The discoloration time in this case was only 1½ hours.

Example 2

A composition according to the invention and similar to that described in Example 1, except that the cadmium stearate was replaced by 8 parts by weight of basic lead carbonate, was prepared into sheets 0.05 inch thick as described. The cold flex temperature of the sheet material was measured in accordance with British Standard No. 2571 on successive days and was found to increase slowly from −15.5° C. initially to −13° C. at the fifth day.

A similar series of tests of a control composition which was identical except that the antioxidant component was absent, showed a rapid increase to −12.25° C. at the second day, after which cracking was apparent.

Similar samples were also submitted to plasticizer loss tests. Each was stored at 100° C. Both the samples showed a substantially linear loss of plasticizer, the control sample loss, however, being greater. Thus, after five days the loss from the control sample was 3.2% weight whereas the loss from the composition according to the present invention was only 2% weight.

Example 3

In this example two plasticized polyvinyl chloride compositions according to the invention were made up into sheets as described in Example 1, except that one contained 0.1% and the other 0.2% of the tris antioxidant described, and the plasticizer in both was so-called di-isodecyl phthalate, i.e. the ester of phthalic acid with a $C_{10}$ alcohol made by the carbonylation process from propylene trimer.

The samples were tested for discoloration as described in Example 1. Two further similar compositions were tested, one a control with no antioxidant and the other containing as antioxidant 0.5% by weight of bis-phenylol propane, which is commonly used for this purpose.

For the sample with no antioxidant, the time was only 30 minutes; with 0.1% tris-antioxidant, 120 minutes and with 0.2% tris-antioxidant, 180 minutes. Both compositions according to the invention therefore showed substantial improvement over the control. Moreover, even with 0.5% of the bis-antioxidant, the time was nevertheless only 180 minutes, i.e. no better than the compositions with only 0.2% of the tris antioxidant, which is therefore more effective on a weight basis.

*Example 4*

A similar discoloration test to that described in Example 3 was carried out in this example on samples which were of similar composition except that the plasticizer used was so-called di-tridecyl phthalate, i.e. the phthalate ester of a $C_{13}$ alcohol made by the carbonylation process from propylene tetramer. The results were as follows:

The time for the control sample with no antioxidant was 60 minutes; for the sample with 0.1% of the tris antioxidant, 150 minutes, and for that with 0.2%, 300 minutes. The time for the sample with 0.5% of the bis antioxidant was 270 minutes.

*Example 5*

Similar discoloration tests to those described in Example 1 were carried out in this example on samples of similar compoistion to those tested in Example 1, except that the antioxidant was prepared by condensing 3 moles of 3,6-dimethyl phenol with one mole of crotonaldehyde, and may be regarded as methyl tris(para-3,6-dimethyl phenol) propane. The discoloration time for the sample with this antioxidant was 5 hours. The time for the control sample without antioxidant was 1½ hours.

*Example 6*

A composition similar to that containing antioxidant and tested in Example 5, but containing 8 parts by weight of basic lead carbonate instead of cadmium stearate, was submitted to a cold flex temperature test as described in Example 2. The initial temperature was −15° C., which after 5 days rose to −14° C. This may be compared with the control tested in Example 2, where cracking occurred after 2 days.

Similar samples were tested for plasticizer loss as described in Example 2. The sample with antioxidant lost 1.5% weight after 5 days, whereas the control sample with no antioxidant lost 3.5% weight over the same period.

The compositions according to the invention in the above examples which contain cadmium stearate are suitable for use where a colorless transparent plasticized polyvinyl chloride composition is desired. Other polyvinyl chloride compositions according to the invention may be formulated with different ingredients to meet different requirements. For example, for electrical insulation purposes compoistions using the di-isodecyl and di-tridecyl ester plasticizers according to the invention are preferred particularly with basic lead carbonate or sulphate and calcium stearate ingredients, and optionally with an inert clay filler ingredient such as bentonite.

I claim:
1. A stabilized polyvinyl chloride composition which comprises polyvinyl chloride, a phthalate ester of at least one alkanol having from about seven to about thirteen carbon atoms as a plasticizer for said polyvinyl chloride, and a stabilizing amount of a tris(hydroxy-phenyl)propane compound of structure

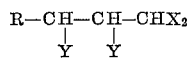

wherein R is selected from the group consisting of hydrogen, methyl and phenyl, X is selected from the group consisting of 3-lower alkyl, 6-lower tertiary alkyl-hydroxyphenyl and 2-lower alkyl, 6-lower tertiary alkyl-hydroxyphenyl, and Y is selected from the group consisting of hydrogen and X, one Y being hydrogen and the other Y being the same as X.

2. A composition according to claim 1 wherein the stabilizer is methyl tris(para-3-methyl-6-tert.butylphenol) propane.

3. A composition according to claim 1 wherein the stabilizer is methyl tris(para-3,6-dimethylphenol)propane.

4. A composition according to claim 1 in which the said stabilizing amount is less than 1% by weight.

References Cited by the Examiner

UNITED STATES PATENTS

| 2,801,989 | 8/57 | Franham | 260—619 |
| 2,885,385 | 5/59 | Franham | 260—619 |
| 3,075,940 | 1/63 | Pazinski et al. | 260—45.95 |
| 3,091,597 | 5/63 | Henriques | 260—45.95 |

FOREIGN PATENTS

| 702,848 | 1/54 | Great Britain. |
| 1,031,083 | 6/53 | France. |

OTHER REFERENCES

Smith: British Plastics, 27, 176–179.
Smith British Plastics, 27, 307–311.

LEON J. BERCOVITZ, *Primary Examiner.*

MILTON STERMAN, *Examiner.*